Patented Feb. 18, 1947

2,416,236

UNITED STATES PATENT OFFICE 2,416,236

SERIES OF NITROFURAN COMPOUNDS

William B. Stillman and Albert B. Scott, Norwich, N. Y., assignors, by mesne assignments, to Eaton Laboratories, Inc., Norwich, N. Y., a corporation of New York No Drawing. Original application August 28, 1945, Serial No. 613,205. Divided and this application October 19, 1946, Serial No. 704,528

4 Claims. (Cl. 260—345)

This invention relates to a new series of chemical compounds which have proved of therapeutic value, especially when administered orally. The series includes a number of closely related nitrofuran compounds described by the general formula:

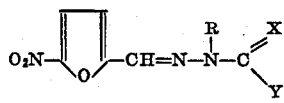

in which R represents hydrogen, alkyl and hydroxyalkyl, X represents a simple divalent substituent such as O or S, and Y represents alkyl.

This application is a division of our application Serial No. 613,205, filed August 28, 1945 as a continuation-in-part of our applications filed May 17, 1944 and bearing respectively Serial Numbers 536,046, 536,047 and 536,048.

We have made the discovery that the new compounds, while sharing the antiseptic properties which are common to many nitrofurans, are distinguished therefrom by their effectiveness against infections when administered orally. In doses well below the toxic limit, they have proved highly effective in the treatment of streptococcus and trypanosome infections, gonorrhea, cystitis, pyelitis and peritonitis following appendectomy. They are new drugs which are effective against a wider range of bacteria than is penicillin, and they are not subject to the difficulties encountered in the use of penicillin because of its instability. Unlike the sulfonamides, they are bactericidal as well as bacteriostatic and maintain these activities in the presence of body fluids, bacterial debris and dead tissue. In short, they are valuable chemotherapeutic agents.

The preparation of the new drugs in a form which will permit ready oral administration is easy. The particular new drug selected for use may be incorporated in tablets or in lozenges. Such tablets are compounded in conventional fashion by granulating the drug with standard starch paste, drying, adding dry starch and pressing out the tablets. The lozenges are compounded in conventional fashion also, by granulating with sugar syrup and then adding bulk in the form of powdered sugar and dry starch, and a flavoring material.

The various members of the new series of drugs differ from each other somewhat in degree of therapeutic activity. A particular member of the series which we now prefer and which has been found to provide an extremely valuable chemotherapeutic agent is 5-nitro-2-furaldehyde semicarbazone. Tablets or lozenges containing about one-quarter gram of that drug administered orally to humans have exhibited astonishing effectiveness in combating infections.

The new compounds may be synthesized by means of the well-known reaction between aldehydes or ketones and compounds possessing a reactive amido group. The aldehyde 5-nitrofurfural (or related ketones) is condensed with a compound which will provide a side chain having the following configuration:

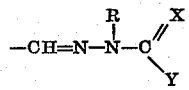

in which R, X and Y have the significance described above.

In order that the invention may be entirely available to those skilled in the art, a method for making an example of the new series of compounds is described briefly:

EXAMPLE

*5-Nitro-2-furfurylidene acethydrazide*

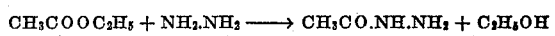

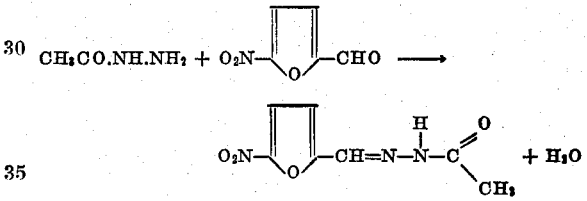

Acethydrazide is prepared from ethyl acetate and hydrazine hydrate according to the method of Curtius and Hoffman, J. Prakt. Chem. (2) 53, 524 (1893). A solution is prepared from 3.5 g. (0.047 mole) of acethydrazide and 100 cc. of water, and to this is added 6.7 g. (0.047 mole) of 5-nitrofurfural. The mixture is stirred for five minutes, at which time precipitation of the condensation product commences. It is allowed to stand for one-half hour, and the 5-nitro-2-furfurylidene acethydrazide is collected on a filter. After recrystallization from a mixture of acetic acid and alcohol (1:1), the product is obtained as a microcrystalline yellow solid; yield, 6.9 g. (74%); it begins to darken at 220° and melts (w. decomp.) at 230–235°; solubility in water, 1:20,000.

What is claimed is:

1. A compound having chemotherapeutic activity on oral administration and represented by the formula:

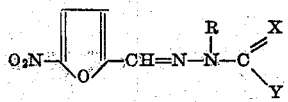

in which R represents a member of the group consisting of hydrogen, alkyl and hydroxyalkyl, X represents a member of the group consisting of O and S, and Y represents alkyl.

2. A new chemical compound having chemotherapeutic activity and represented by the formula:

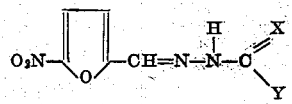

in which X represents a member of the group consisting of O and S, and Y represents alkyl.

3. A new chemical compound having chemotherapeutic activity and represented by the formula:

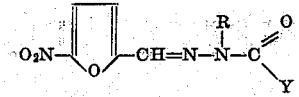

in which R represents a member of the group consisting of hydrogen, alkyl and hydroxyalkyl, and Y represents alkyl.

4. 5-nitro-2-furfurylidene acethydrazide represented by the formula:

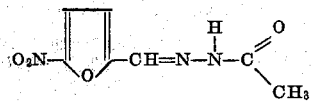

WILLIAM B. STILLMAN.
ALBERT B. SCOTT.